United States Patent [19]
Hiraga et al.

[11] Patent Number: 5,632,817
[45] Date of Patent: May 27, 1997

[54] DUAL COMPONENTS MIXING SYSTEM FOR COATING

[75] Inventors: Toshio Hiraga; Masayuki Kuroda; Hidetoshi Kamaru; Youji Murata, all of Tokyo, Japan

[73] Assignee: Ransburg Industrial Finishing K.K., Tokyo, Japan

[21] Appl. No.: 523,856

[22] Filed: Sep. 6, 1995

[30] Foreign Application Priority Data

Sep. 6, 1994 [JP] Japan ................... 6-212450

[51] Int. Cl.⁶ ............................................. B05C 5/00
[52] U.S. Cl. .................. 118/663; 118/684; 118/688; 118/692; 118/708; 118/710; 118/712; 118/300
[58] Field of Search ................... 118/663, 684, 118/688, 692, 708, 710, 712, 300

[56] References Cited

U.S. PATENT DOCUMENTS 4,745,011  5/1988  Fukuta et al. ................ 118/300

FOREIGN PATENT DOCUMENTS

| | | |
|---|---|---|
| 5-49977 | 3/1993 | Japan . |
| 5-41305 | 6/1993 | Japan . |
| 5-269419 | 10/1993 | Japan . |
| 5-269420 | 10/1993 | Japan . |
| 6007715 | 1/1994 | Japan ................ 118/688 |
| 6-34756 | 5/1994 | Japan . |
| 6-41857 | 6/1994 | Japan . |
| 6-210227 | 8/1994 | Japan . |
| 6-294379 | 10/1994 | Japan . |
| 7-552 | 1/1995 | Japan . |

*Primary Examiner*—Laura Edwards
*Attorney, Agent, or Firm*—Schwartz & Weinrieb

[57] ABSTRACT

A dual component mixing system for coating comprises a first tank containing a main agent, a second tank containing a hardening agent diluted with thinner, a mixer which mixes the main agent and the hardening agent and supplies the mixture to a manually operated coating gun, a main agent line connecting the mixer and the first tank, a hardening agent line connecting the mixer and the second tank, a flow meter disposed within the main agent line, a flow meter and a flow regulating valve disposed within the hardening agent line, and a feedback control device which receives signals from the flow meters and controls the flow regulating valve so that the amount of hardening agent is a predetermined ratio with respect to the amount of main agent. The dual component mixing system according to the present invention provides an adequate control of the main agent/hardening agent ratio regardless of the differences among individuals manipulating the coating gun.

20 Claims, 3 Drawing Sheets

DUAL COMPONENTS MIXING SYSTEM FOR COATING

FIELD OF THE INVENTION

The present invention relates to a dual component mixing system for a coating which mixes a primary or main agent and a hardening agent immediately before supplying such agents to a coating gun, and more particularly, to a manually operated coating gun.

DESCRIPTION OF THE PRIOR ART

It is known, for example, that a urethane coating is used by mixing the same with a hardening agent immediately before coating an object by using a coating gun. As examples of such systems which mix a main agent and a hardening agent, dual component mixing systems as described in Japanese Patent Laid-Open Disclosure No. 5-49977 and Japanese Patent Public Dis-closure No. 5-41305 are known.

The dual component mixing system disclosed in Japanese Patent Public Disclosure No. 5-41305 is constituted in such a way that a main agent, a hardening agent, and a thinner for dilution are fed to a mixer through separate lines. After they are mixed together by the mixer, the mixture is supplied to a manually operated gun. Furthermore, in order to control the mixture ratio of the main agent and the hardening agent, a gear-pump is utilized. It is constituted so that the mixture ratio of the main agent and the hardening agent equals a predetermined value by regulating the ratio of rotation of a gear-pump for the main agent and the rotation of a gear pump for the hardening agent.

OBJECTS OF THE INVENTION

When a coating gun is manually operated, there are differences in the gun operations when the gun is operated by different individuals. It is, therefore, an object of the present invention to provide a dual component mixing system having an automatic control system for controlling the mixture ratio of a main agent and a hardening agent that is suitable for manually operated guns.

It is a further object of the present invention to provide a dual component mixing system that enables one to reduce the time consumed to change colors of the coating materials.

SUMMARY OF THE INVENTION

The above and other objects of the present invention can be accomplished by a dual component mixing system for coating, comprising: a first tank containing a main agent; a second tank containing a hardening agent diluted with a thinner; a mixer which mixes the main agent and the hardening agent and is adapted for supplying the mixture to a manually operated coating gun; a main agent conduit which connects the mixer with the first tank; a hardening agent conduit which connects the mixer with the second tank; means for detecting the flow rate of the main agent flowing within the main agent conduit; means for detecting the flow rate of the hardening agent flowing within the hardening agent conduit; flow regulating means disposed within the hardening agent conduit upon the upstream side of the means for detecting the hardening agent flow rate; and feedback control means for receiving signals from the means for detecting the flow rate of the main agent and the means for detecting the flow rate of the hardening agent, and for controlling the flow regulating means so that the ratio of the hardening agent is a predetermined mixture ratio with respect to the amount of the main agent detected by the means for detecting the flow rate of the main agent. According to the present invention, since the flow rate of the hardening agent is constituted in such a way as to follow the flow rate of the main agent, it is relatively easy to construct a control system for controlling the mixture of the dual components discharged by the manually operated coating gun whereas it is usually difficult to set a target value for controlling both the main agent and the hardening agent. Furthermore, since it is constructed to carry out the feedback control with respect to the hardening agent whose volume, that is, flow rate, is increased by diluting the same with the thinner, whereas the mixture ratio is relatively small in general, the control accuracy can be improved as compared with a case where its volume is not increased. In addition, to achieve the same level of control accuracy as that of the conventional system, the control system itself can be designed with less accuracy. Therefore, the manufacturing cost of the system can be reduced.

In accordance with a preferred aspect of the present invention, a dual component mixing system for coating further comprises: memory means for storing a plurality of values detected by the means for detecting the flow rate of the hardening agent in chronological order; an operation detecting sensor for detecting the on/off state of the manually operated coating gun; operation interruption detecting means for detecting the interruption of the operation of the manually operated coating gun; target value setting means for receiving a signal from the operation interruption detecting means and the operation detecting sensor, and for setting a value corresponding to the value which is stored prior to the storing of one or more values among the values stored in the memory means as a target value for the feedback control means if the operation detecting sensor detects the fact that the manually operated coating gun is switched on after the operation of the manually operated coating gun is interrupted; control mode changing means for switching to an ordinary feedback control by the feedback control means when a predetermined length of time has passed after the target value setting means sets the target value. According to the preferred aspect of the present invention, the data value which is the one stored prior to the storing of one or more values among the values stored in the memory means as a target value, that is, it is the data value detected before the interruption of the coating operation, is fed back as a target value for a predetermined period of time when the coating operation is carried on after the operation is interrupted. Therefore, it is possible to adequately control the mixture ratio immediately after the operation is carried on without a delay in detection that is peculiar to the flow rate sensor which detects fluids having high viscosity. Therefore, the time consumed until the feedback control is stabilized can be reduced.

In a still further preferred aspect of the present invention, a dual component mixing system for coating further comprises: target value input means for allowing a manual input of the target value of the feedback control operation; target value changing means for changing, upon receiving a signal from the operation detecting means, a target value to the inputted target value as a target value of the feedback control means when the manually operated coating gun is switched on. According to the preferred aspect of the present invention, since it is constructed to feed back the preferable target value inputted by the operator, the mixture can be adequately controlled without having any effect due to a delay in detection which is common in a sensor detecting the flow rate of fluids with high viscosity. In addition, the time consumed until the feedback control is stabilized can be reduced significantly.

In accordance with a further preferred aspect of the present invention, an upstream portion of the main agent conduit is provided with a common flow path whose upstream end is closed; a first three port two position valve disposed within the common flow path; a second three port two position valve disposed within the common flow path; a first on-off type valve disposed within the upstream end of the common flow path; the first three port two position valve is connected with a first branch pipe to which the first tank is releasably joined, and with a first drain pipe to which a first on-off type valve for drainage is connected; the second three port two position valve is connected with a second branch pipe to which a sub-tank, containing a main agent which is different from the main agent contained in the first tank, is releasably connected, and with a second drain pipe to which a second on-off type valve for drainage is connected; and the first on/off type valve is connected with a cleaning pipe that extends from a cleaning pot which ejects cleaning fluid and air alternatively. Therefore, a smaller number of valves is needed since the cleaning pot which ejects cleaning fluid and air alternatively is utilized and it is not necessary to be provided with separate valves for the cleaning fluid and air since only one valve needs to be provided therefor. Since a separate path is formed from the first tank to the drain pipe through the first three port two position valve after changing from the first tank to the sub-tank, the path can be cleaned by itself. Therefore, even when the sub-tank is replaced by the first tank, only the downstream portion of the common flow path needs to be washed, thereby reducing the time consumed for a tank changing operation.

In accordance with a further preferred aspect of the present invention, a dual component mixing system for performing the coating operation further comprises: a manually operated coating gun for coating articles, objects, or substrates.

BRIEF DESCRIPTION OF THE DRAWINGS

The above and other objects and features of the present invention will become apparent from the following description made with reference to the accompanying drawings, in which like reference characters designate like or corresponding parts throughout the several views, and wherein.

DESCRIPTION OF THE ILLUSTRATED EMBODIMENTS

Now, specific embodiments of the present invention will be described with reference to the drawings.

Figure 1:
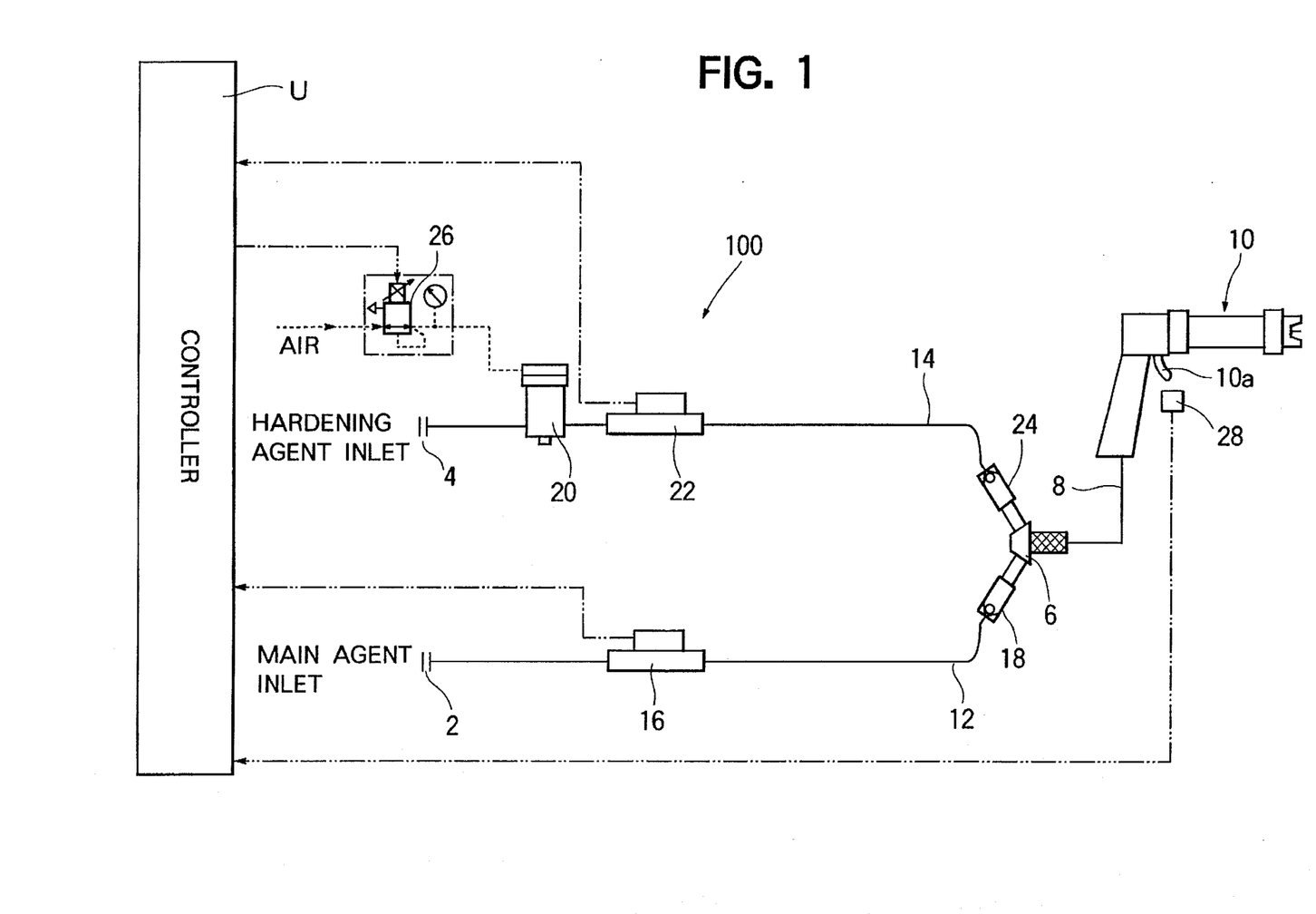
FIG. 1 is a schematic diagram of a dual component mixing system according to a preferred embodiment of the invention as shown in general.
Figure 2:
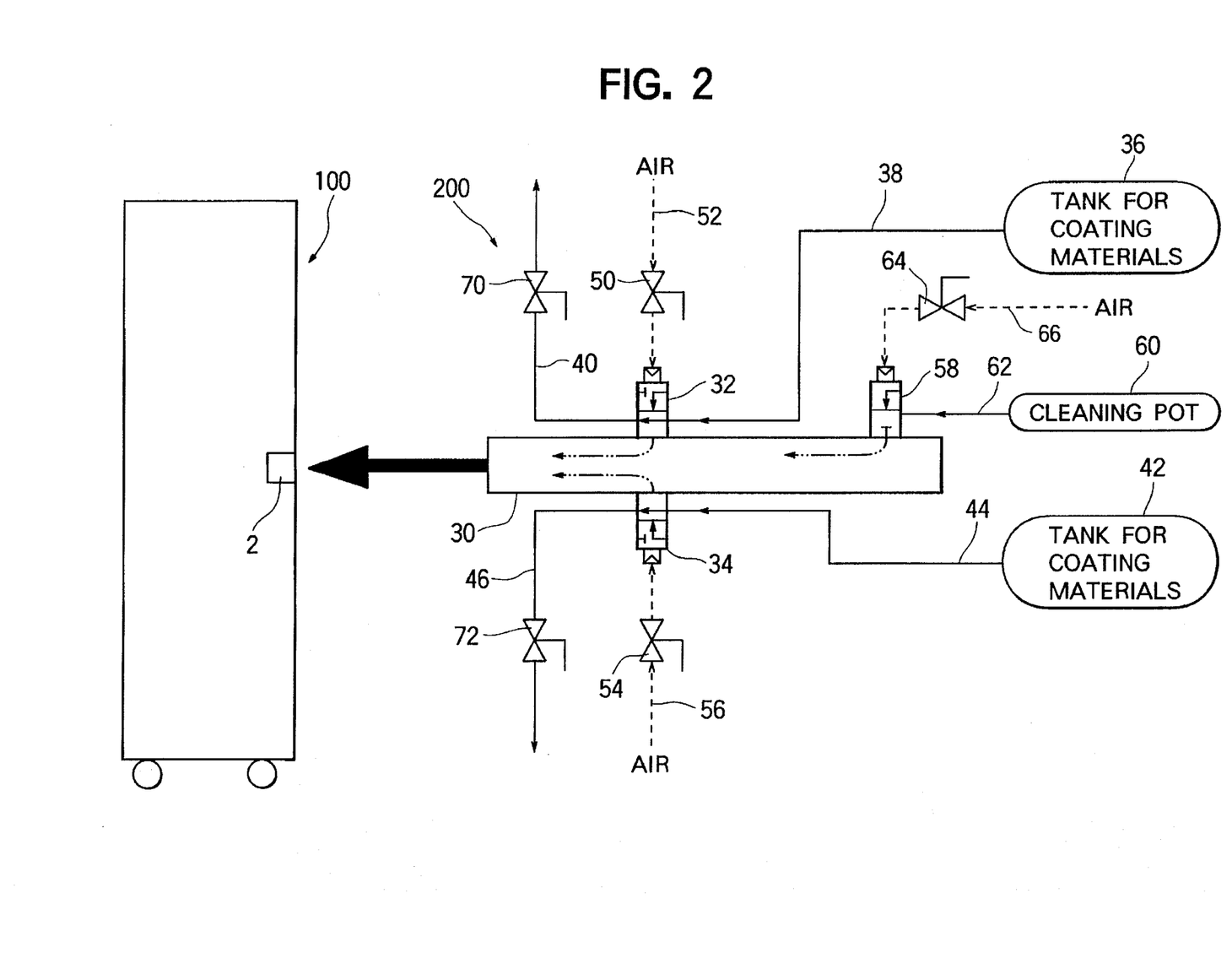
FIG. 2 is a schematic diagram of a coating material color changing unit.

FIG. 1 is a schematic diagram of a dual component mixing system according to a preferred embodiment of the present invention which is shown in general. The dual component mixing system 100 comprises a main agent inlet 2 for receiving a main agent and a hardening agent inlet 4 for receiving a hardening agent. The main agent inlet 2 may be connected with, for example, any coating material supply system having a pressure tank, a diaphragm pump, or a plunger pump which are commonly used. However, in this preferred embodiment, a coating material color changing unit 200 shown in FIG. 2 is connected therewith. The details of the coating material color changing unit 200 will be explained below.

The hardening agent inlet 4 is connected with a pipe extending from a tank for hardening agents, not shown, and a hardening agent contained in the tank is delivered to the inlet 4 under pressure by a pump, also not shown. The dual component mixing system 100 includes a mixer 6 for mixing a coating material, that is, a main agent and a hardening agent. A dual component mixture which contains the main agent and the hardening agent mixed by the mixer 6 is supplied to a manually controlled spray gun 10 through a flexible tube 8 and is sprayed onto an object, not shown, thereby.

The mixer 6 is connected with the main agent inlet 2 through a main agent conduit or tube 12 and is connected with the hardening agent inlet 4 through a hardening agent conduit or tube 14. The main agent conduit 12 is provided with a flow meter 16 for the main agent such as a gear-rotor type flow meter or the like which detects the flow rate of the main agent and a check valve 18 at the upstream side of the mixer 6. The check valve 18 permits the main agent to flow toward the mixer 6 from the inlet 2 but prevents its flow in a reverse direction. The hardening agent conduit 14 is provided with a flow regulating valve 20 whose ratio of valve opening is regulated by a pressure regulating valve controlled by pneumatic pressure, a hardening agent flow meter 22 such as a gear-rotor type flow meter or the like that detects the flow rate of the hardening agent, and a check valve 24 at the upstream side of the mixer 6, which are arranged in this order from the inlet 4 toward the mixer 6. The check valve 24 permits the hardening agent to flow toward the mixer 6 from the inlet 4 but prevents its flow in a reverse direction.

A coating material color changing unit 200 includes a common flow path 30 as shown in FIG. 2. The common flow path 30 is releasably connected at one end thereof with the main agent inlet 2 of the dual component mixing system 100 and the other end thereof, that is, the upstream end, is closed. The common flow path 30 is provided with a first color changing valve 32 and a second color changing valve 34. Both of the valves 32, 34 comprise a three port two position valve operated pneumatically. The first color changing valve 32 is connected with a first coating material conduit 38 which is in communication with a first tank for coating materials 36, and a drain pipe 40.

Switching of the first color changing valve 32 is controlled by air supplied through an air passage 52 provided with a two-way type valve 50 which is manually operated. When the control valve 50 is closed, the first coating material conduit 38 is in communication with the drain pipe 40. When the control valve 50 is opened, the first coating material conduit 38 is in communication with the common flow path 30, thereby supplying the coating material in the first tank for coating materials 36 thereto.

In the same manner, switching of the second color changing valve 34 is controlled by air supplied through an air passage 56 provided with a two-way type valve 54 which is manually operated. When the control valve 54 is closed, the second coating material conduit 44 is in communication with the drain pipe 46. When the control valve 54 is opened, the second coating material conduit 44 is in communication with the common flow path 30, thereby supplying the coating material in the second tank for coating materials 42 thereto. It should be noted that the coating materials in the first tank for coating materials 36 and second tank for coating materials 42 are delivered, as is known, by means such as a diaphragm pump, a plunger pump, or the like, disposed near those tanks.

The upstream end of the common flow path 30 is provided with a cleaning valve 58 comprised of a two port two position valve. The cleaning valve 58 is connected with a cleaning fluid conduit 62 which is in communication with a cleaning pot 60. The cleaning pot 60 is for ejecting thinner and air to be used for cleaning in an alternative mode, as known. Switching of the cleaning valve 58 is controlled by air supplied through an air passage provided with a two-way type control valve 64 which is manually operated. When the control valve 64 is closed, communication between the pipe for cleaning fluid 62 and the common fluid path 30 is shut off. When the control valve 64 is opened, the cleaning fluid conduit 62 is in communication with the common flow path 30, thereby supplying the cleaning thinner from the pot 60 thereto.

Different colors or types of coating material may be contained in each of the first tank for coating materials 36 and the second tank for coating materials 42 and those tanks 36 and 42 can be used selectively. A method of changing the colored coating materials to be supplied to the dual component mixing system 100 will be described in a case where the color is changed from the colored material of the first tank for coating materials 36 to the colored material of the second tank for coating materials 42 as an example.

First, the first color changing valve 32 is turned off, that is, communication between the first tank for coating materials 36 and the common flow path 30 is shut off and communication between the first tank for coating materials 36 and the first drain pipe 40 is allowed. Then, the control valve for cleaning 64 is opened and communication between the cleaning fluid conduit 62 and the common flow path 30 is allowed, whereby the common flow path 30, the passages within the dual component mixing system 100, and the spray gun 10 are washed with thinner contained in the pot 60. After completing the cleaning step, the second color changing valve 34 is opened, thereby allowing communication between the second tank for coating materials 42 and the common flow path 30. Carrying out those steps above, the coating material to be supplied to the spray gun 10 is switched from the first tank 36 to the second tank 42 and the coating material contained in the second tank for coating materials 42 is fed to the spray gun 10 through the common flow path 30.

After the color changing steps above, the first tank for coating materials 36 may be replaced by a third tank for coating materials, not shown. That is, after the first tank for coating materials 36 is removed from the first coating material conduit 38, the third tank for coating materials containing another kind of coating material may be connected with the first coating material conduit 38. Such tank changing process is carried out as follows.

As discussed above, communication between the first tank for coating materials 36 and the common flow path 30 is shut off by closing the first color changing valve 32, communication between the second tank for coating materials 42 with the common flow path 30 is terminated, and the first tank for coating materials 36 is removed from the first coating material conduit 38. Then, a tank containing thinner for cleaning, not shown, is connected with the first coating material conduit 38, and at the same time, a drain valve 70 comprised of a two-way type valve which is manually operated and disposed in the first drain pipe 40 is opened, whereby the first coating material conduit 38 and the first color changing valve 32 are washed and cleaned by the thinner flowing therein.

The case where the first tank for coating materials 36 is changed to the second tank for coating materials 42 has been described above. The opposite case where the second tank for coating materials 42 is changed to the first tank for coating materials 36 can be carried out in substantially the same manner. Furthermore, the case where the second tank for coating materials 42 is replaced by a fourth tank for coating materials can be carried out in substantially the same manner. It should be noted that the reference character 72 shown in FIG. 2 is a second drain valve disposed in the second drain pipe 46 and comprises a manually operated two-way type valve.

According to the color changing unit 200, since the cleaning pot 60 is employed, having only one cleaning valve 58 is sufficient. It means that, as conventionally required, it is not necessary to have two cleaning valves for thinner and for air. Furthermore, since the tank for coating materials 42, or 36, can be replaced by another tank for coating materials while using the other tank for coating materials 36, or 42, it is possible to reduce any operational interruption time due to a change in tanks, that is, the time consumed for cleaning. As has been discussed, since the tanks are interchangeable, colors can be changed to any colors simply by operating two color changing valves 32,34. By utilizing a remote control valve instead of the valve used in unit 200, automatic color change operation will be possible.

Now, turning to FIG. 1 again, the dual component mixing system 100 comprises a controller U comprised of a microcomputer provided with, for example, RAM, ROM, CPU components, or the like. Flow rate signals from the main agent flow meter 16 and the hardening agent flow meter 22 are inputted into the controller U. Intervals for taking samples of the flow rate data by both flow meters 16,22 are 1.5 seconds and it means that the samples of the flow rate of the main agent and the hardening agent are taken once every 1.5 seconds. The controller U transmits a control signal toward a pressure regulating valve 26.

Figure 3:
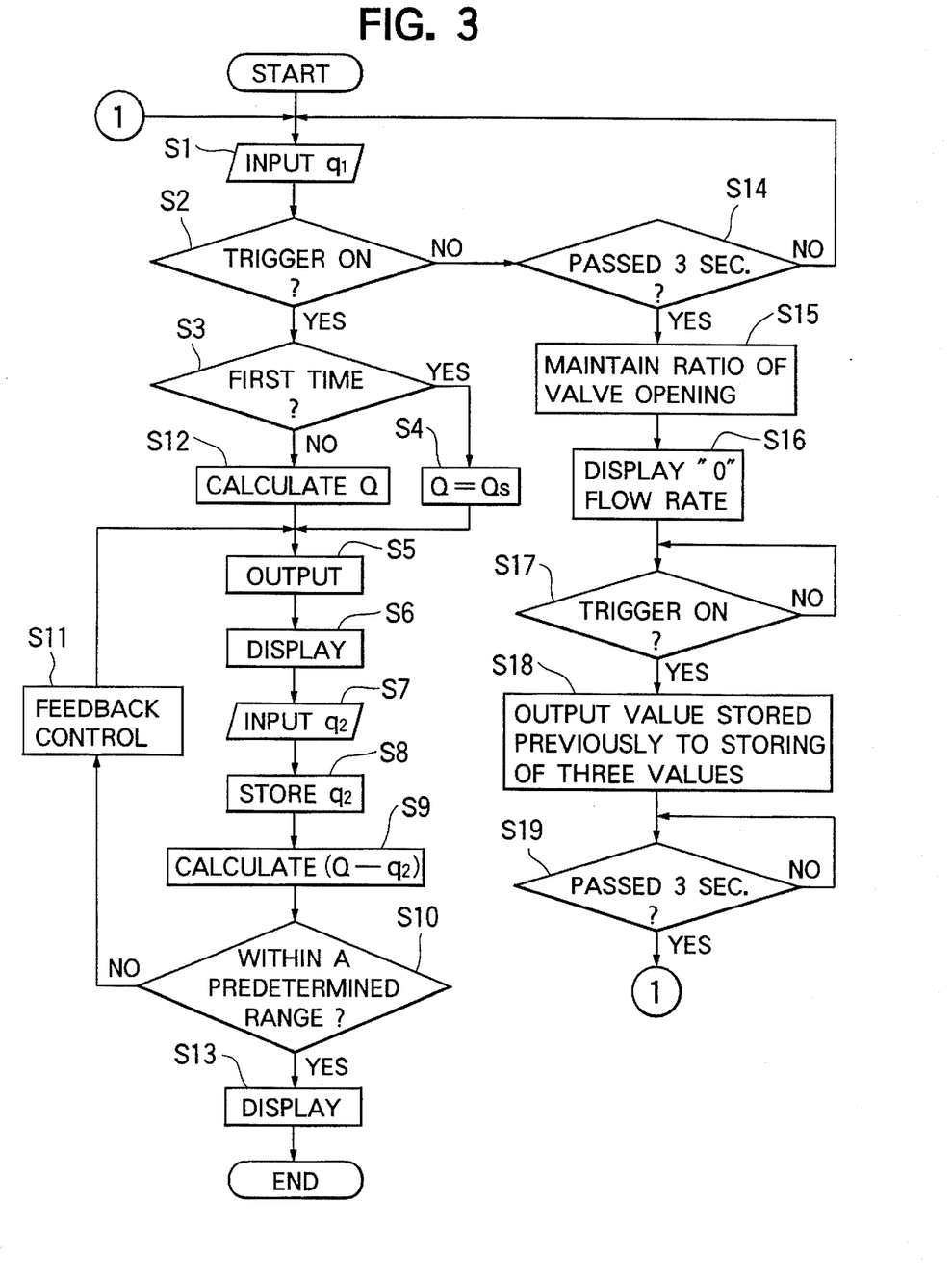
FIG. 3 is a flow chart showing an example of a control flow operation by a controller U of FIG. 1.

With reference to FIG. 3, an example of a control system or process controlled by controller U shall be explained briefly before getting into the details.

An adequate ratio of the main agent and the hardening agent constituting the dual component type coating material is determined depending on the kind of coating materials, and it is usually directed by manufacturers of the coating materials. The viscosity of the mixture of the main agent and the hardening agent is adjusted so as to be suitable for coating by diluting them with thinner. In general, as has been conventionally done, the main agent is diluted with an adequate amount of thinner. Now, it is generally the case that the mixture ratio of the coating materials is larger than desired with respect to the amount of the hardening agent incorporated therein, and in some cases, depending on the type of coating materials, the ratio of the hardening agent incorporated therein is much smaller than desired for the coating materials. Considering such circumstances, in the preferred embodiment, the hardening agent supplied to the tank is diluted with thinner in order to increase the flow rate of the hardening agent, thereby increasing the volume of the hardening agent. Of course, when the viscosity of the main agent is too high, thinner may also be added to the tank for the main agent thereby adjusting the viscosity of the main agent in the tank to its adequate level.

In the preferred embodiment, the flow rate of the coating material flowing in the main agent conduit 12 whose flow rate is relatively high is detected, and the flow rate of the hardening agent supplied to the mixer 6 is controlled by feeding back the detected value (PID control) so that the flow rate of the hardening agent corresponds to the flow rate of the main agent coating material. Based on such conditions, an example of how the control is carried out shall be explained below.

Before actually starting a coating operation using the manually operated spray gun 10, various data is initially inputted into the controller U. The data to be inputted is as follows:

(1) Set a fixed off-set amount.

A fixed off-set amount is defined as an amount that is the sum of a theoretical ratio of the hardening agent with respect to the coating agent and "a" where "a" is a margin amount of hardening agent. It is possible for an operator to avoid a shortage of hardening agent, occurring for some reason, by setting a preferable off-set amount.

(2) Input a step-up flow rate (Qs).

A step-up flow rate (Qs) is defined as a target flow rate to be set so as to open the flow regulating valve 20 to a predetermined degree immediately after an operation has been started in order to reduce the time needed to stabilize the mixing rate. The operator can even carry out the coating operation without a shortage of hardening agent immediately after starting the operation by inputting an adequate step-up flow rate (Qs).

(3) Input a mixture ratio of coating material (main agent) and hardening agent.

(4) Input a dilution rate of hardening agent with thinner.

(5) Input a dilution rate of main agent with thinner.

(6) Input the specific gravity of the thinner for dilution.

(7) Input the specific gravity of the hardening agent.

(8) Input the specific gravity of the main agent.

(9) Input a correction value with respect to the flow rate value detected by the main agent flow meter 16 and the hardening agent flow meter 22. The correction value is mainly for compensating for an error due to the viscosity of the main agent and the hardening agent.

After completion of the initial setting operation in step 1, q1, which is the flow rate of the coating material measured by the main agent flow meter 16, is inputted, and in step 2, as seen from FIG. 3, it is determined whether the trigger 10a of the gun is ON based on the flow rate q1 of the coating material. In step 2, if it is determined that the trigger 10a is ON, proceed to step 3. In step 3, it is determined whether the trigger 10a is pulled for the first time. If it is determined as YES, that is, it is the first time, proceed to step 4. In step 4, the step-up flow rate Qs, that is, the target flow rate of the hardening agent, is set. In step 5, a control signal is outputted to the pressure regulating valve 26 whereby the ratio of the valve opening of the flow regulating valve 20 is controlled so as to correspond to the step-up value Qs.

In step 6, the flow rate q1 of the coating material passing by the main agent flow meter 16 and the target flow rate of the hardening agent are displayed on a display, not shown. In step 7, the flow rate q2 of the hardening agent passing by the hardening agent flow meter 22 is inputted. In step 8, the flow rate q2 of the hardening agent as detected is stored, that is, a FIFO device containing four data values is updated. In step 9, the control error, (Q-q2) of the hardening agent is calculated. In step 10, it is determined whether the control error (Q-q2) lies within a predetermined range. If it is determined as NO, go back to step 5 through step 11 until the flow rate q2 of the hardening agent as measured by the hardening agent flow meter 22 reaches the target flow rate Q. It means that a feedback signal is outputted to the pressure regulating valve 26 whereby the degree of the valve opening of the flow regulating valve 20 is increased or decreased. If the flow rate of the hardening agent is stabilized, that is, if it is determined as YES in step 10, proceed to step 13. The flow rates of the main agent and the hardening agent as detected by the flow meters 16,22, respectively, that is, the current flow rates, are displayed selectively in units of "ml/min" or "g/min". While the trigger 10a of the manually operated spray gun 10 is manipulated, it is continuously monitored. If the trigger is pulled for the second time or more, proceed from step 3 to step 12. In step 12, the calculated target value Q of the hardening agent is set, and it is controlled based on the calculated target value Q.

If the trigger 10a of the gun 10 is switched OFF, that is, if it is determined as NO in step 2, proceed to step 14. In step 14, it is determined whether more than three seconds has passed since the operation was interrupted. It should be noted that the reason why three seconds of interrupted operation of the trigger 10a is monitored in order to detect an interruption of the operation is because the flow rate data sampling intervals, as measured by the flow meters 16,22, are once every 1.5 seconds. If it is determined as YES in step 14, after maintaining the degree of valve opening of the flow regulating valve 20 at the current level, in step 15, "zero amount of main agent and hardening agent is used" is displayed in step 16. In step 17, it is monitored whether the operation of the trigger 10a has resumed.

If it is determined as YES in step 17, that is, if the trigger 10a of the gun 10 is again switched ON, proceed to step 18. In step 18, the value, which was stored prior to the storing of three other values stored in the FIFO device, is outputted to the pressure regulating valve 26, whereby the degree of the valve opening of the flow regulating valve 20 is increased to the level at which it was at six seconds before the interruption of the operation. After maintaining this level for three seconds in step 19, go back to step 1 to continue feedback control.

According to the control above, the flow rate of hardening agent automatically follows the flow rate of the main agent. Since the agent whose mixture ratio is relatively small is diluted and the agent having an increased volume is controlled by the feedback control system, the control accuracy can be improved as compared to the case where the volume of the hardening agent is not increased. In other words, the control system can be designed so as not to be as precise as is conventionally required and nevertheles stay within the same range of control accuracy, and therefore, the manufacturing cost of the system itself can be reduced.

Furthermore, immediately after the coating operation is started, the degree of the valve opening of the flow regulating valve 20 is controlled based on the target rate, that is, the step-up amount Qs, inputted by the operator. Therefore, it makes it easier to improve the mixing rate of the hardening agent immediately after the coating operation is started as compared with the case where there is an error or delay in control due to a delay in detection which is common in a sensor which detects the flow rate of a fluid having high viscosity. In addition, the time consumed to stabilize the feedback control can be reduced significantly. Also, the valve opening can be controlled corresponding to the differences in gun operation among individuals especially in the beginning of the operation since the operator himself can input a preferable step-up amount Qs before starting the operation.

When the interrupted operation is resumed, the value memorized before the interruption is used as the target value for controlling the flow regulating valve 20 as in step 18. Therefore, the control of the flow regulating valve 20 can be improved. Describing the operation to this point more in detail, once the coating operation is interrupted, that is, the trigger 10a is switched OFF, discharge of material from the gun 10 stops immediately. However, the main agent flow meter 16 and the hardening agent flow meter 22 continuously transmit signals that are gradually weakened and the signals are sampled at predetermined intervals.

Thus, the controller U continuously transmits a control signal to the pressure regulating vale 26 for a while even after the interruption of the coating operation. Therefore, the flow regulating valve 20 is continuously controlled so that the degree of the valve opening is decreased. Under such circumstances, if the coating operation is resumed, the flow rate of the hardening agent cannot follow the flow rate of the main agent and a longer period of time is required to adequately control the mixing rate. According to the preferred embodiment, since the flow rate of the hardening agent is controlled based on the opening degree of the flow regulating valve 20 before the interruption of the coating operation, that is, the value which was stored prior to the storing of three other values, immediately after the operation is resumed, it makes it possible to feed the hardening agent at a flow rate which follows the initial flow rate of the main agent even immediately after the coating operation is restarted. Therefore, it is possible to reduce the time consumed to stabilize control of the operation.

Furthermore, the present invention system is constituted in such a way that the control of the system based on the stored value continues until the values detected by the main agent flow meter 16 are stabilized and then it is switched to an ordinary feedback control as in step 19. Therefore, a substantially adequate mixture ratio of the hardening agent can be supplied from the beginning of the operation until after it is carried on without a delay in detection by the flow meter on the main agent side or in detection by the flow meter on the hardening agent side. This makes it possible to significantly reduce the time consumed to obtain stability after the system is switched to the ordinary feedback control. If the system is not controlled in such a manner, that is, if the system is controlled by the ordinary feedback control from the beginning of the operation that is carried on, it takes about 10–15 seconds until it is stabilized. In this preferred embodiment, the time consumed until its stability is achieved can be reduced in half.

The present invention has thus been shown and described with reference to specific embodiments. However, it should be noted that the present invention is in no way limited to the details of the described arrangements but changes and modifications may be made without departing from the scope of the appended claims.

For example, the use of a dual component mixing system according to the present invention is not limited to the use of coating materials and it may also be used in connection with coating adhesives.

In order to be able to deal with a case where the thinner for dilution is added to the main agent as has been conventionally carried out, the controller U of the dual component mixing system may be provided with some modes including a "main agent dilution mode". It may be adapted for switching to a corresponding control mode, that is, switching to a corresponding algorithm of the target value when the operator selects the "main agent dilution mode" before starting its control process.

Furthermore, in this specification and the appended claims, the respective means need not necessarily be physical means, and arrangements whereby the functions of the respective means are accomplished by software fall within the scope of the present invention. In addition, the function of a single means may be accomplished by two or more physical means and the functions of two or more means may be accomplished by a single physical means. It is therefore to be understood that within the scope of the appended claims, the present invention may be practiced otherwise than as specifically described herein.

We claim:

1. A dual component mixing system for mixing together a main agent and a hardening agent, comprising:

a first tank containing a main agent;

a second tank containing a hardening agent diluted with thinner;

a mixer for mixing said main agent and said hardening agent together so as to form a mixture of said main agent and said hardening agent;

a manually operated coating gun operatively connected to said mixer for receiving said mixture of said main agent and said hardening agent;

a main agent conduit operatively interconnecting said first main agent tank to said mixer so as to supply said main agent from said first main agent tank to said mixer;

a hardening agent conduit operatively interconnecting said second hardening agent tank to said mixer so as to supply said hardening agent from said second hardening agent tank to said mixer;

means for detecting the flow rate of said main agent flowing within said main agent conduit;

means for detecting the flow rate of said hardening agent flowing within said hardening agent conduit;

flow regulating means disposed within said hardening agent conduit for regulating the flow of said hardening agent within said hardening agent conduit; and feedback control means, operatively connected to said means for detecting the flow rate of said main agent and to said means for detecting the flow rate of said hardening agent so as to receive signals from said means for detecting the flow rate of said main agent and from said means for detecting the flow rate of said hardening agent, for controlling said flow regulating means so that the amount of said hardening agent within said mixture of said main agent and said hardening agent comprises a predetermined percentage of the amount of said main agent within said mixture of said main agent and said hardening agent.

2. A dual component mixing system for coating materials in accordance with claim 1, further comprising:

memory means for storing, in chronological order, a plurality of flow rate values of said hardening agent as detected by said means for detecting the flow rate of said hardening agent;

an operation detecting sensor for detecting the on/off state of said manually operated coating gun;

operation interruption detecting means for detecting an interruption in the operation of said manually operated coating gun as a function of time;

target value setting means, operatively connected to said operation interruption detecting means and to said operation detecting sensor so as to receive signals from said operation interruption detecting means and from said operation detecting sensor, and operatively connected to said feedback control means, for setting a target, value of said flow rate of said hardening agent which corresponds to the flow rate value of said hardening agent stored within said memory means and which is indicative of said flow rate of said hardening agent before interruption of said operation of said manually operated coating gun, and which is applied to said feedback control means so as to control said flow regulating means in accordance with said set target value of said flow rate of said hardening agent when said operation detecting sensor detects that said manually operated coating gun is switched on after the operation of said manually operated coating gun was interrupted; and control mode changing means for switching to control of said flow regulating means by said feedback control means based upon said signals from said means for detecting said flow rate of said hardening agent, from control of said flow regulating means by said feedback control means based upon said target value of said target value setting means, after a predetermined length of time has passed after said target value setting means has set said target value of said flow rate of said hardening agent.

3. A dual component mixing system for coating materials in accordance with claim 2, further comprising:

a target value input means for allowing manual input of a target value of said flow rate of said hardening agent to be transmitted to said feedback control means; and target value changing means, operatively connected to said feedback control means and said operation detecting sensor, for changing the target value of said flow rate of said hardening agent from said set target value of said flow rate of said hardening agent as set by said target value setting means to said target value of said flow rate of said hardening agent manually inputted by an operator into said target value input means such that said inputted target value can be transmitted as a target value of said flow rate of said hardening agent to said feedback control means when said target value changing means receives a signal from said operation detecting sensor as a result of said manually operated coating gun being switched on.

4. A dual component mixing system for coating materials in accordance with claim 3, wherein:

said main agent is a coating material.

5. A dual component mixing system for coating materials in accordance with claim 2, wherein:

said main agent is a coating material.

6. A dual component mixing system for coating materials in accordance with claim 1, further comprising:

a third tank containing a supply of said main agent which is different from the supply of said main agent disposed within said first tank;

an upstream portion of said main agent conduit being provided with a common flow path portion for fluidic communication with said first and third main agent tanks;

a first three port, two position valve for fluidic communication with said common flow path portion of said main agent conduit, a first main agent branch pipe to which said first main agent tank is releasably joined, and a first main agent drain pipe whereby, depending upon the disposition of said first three port, two position valve, said first main agent tank is fluidically connected to said common flow path portion of said main agent conduit or, alternatively, said first main agent branch pipe is fluidically connected to said first main agent drain pipe; and a second three port, two position valve for fluidic communication with said common flow path portion of said main agent conduit, a second main agent branch pipe to which said third main agent tank is releasably connected, and a second main agent drain pipe whereby, depending upon the disposition of said second three port, two position valve, said third main agent tank is fluidically connected to said common flow path portion of said main agent conduit, or alternatively, said second main agent branch pipe is fluidically connected to said second main agent drain pipe.

7. A dual component mixing system for coating materials in accordance with claim 6, wherein:

said main agent is a coating material.

8. A system as set forth in claim 6, further comprising:

cleaning means for providing a cleaning fluid to said common flow path portion of said main agent conduit; and valve means for fluidically connecting said cleaning means to said common flow path portion of said main agent conduit, so as to provide said cleaning fluid to said common flow path portion of said main agent conduit, said main agent conduit, and said manually operated coating gun, when said first and third main agent tanks are not fluidically connected to said common flow path portion of said main agent conduit.

9. A system as set forth in claim 8, wherein:

said valve means comprises a two position, two port valve.

10. A system as set forth in claim 9, wherein:

said two position, two port valve is a pneumatically operated valve.

11. A system as set forth in claim 6, wherein:

said first and second three port, two position valves comprise pneumatically operated valves.

12. A dual component mixing system for coating materials in accordance with claim 1, wherein:

said main agent is a coating material.

13. A dual component mixing system for mixing together a first component and a second component different from said first component, comprising:

a first tank containing a first component;

a second tank containing a second component different from said first component;

a mixer for mixing said first component and said second component together so as to form a mixture of said first component and said second component;

a first conduit operatively interconnecting said first tank to said mixer so as to supply said first component from said first tank to said mixer;

a second conduit operatively interconnecting said second tank to said mixer so as to supply said second component from said second tank to said mixer;

first means for detecting the flow rate of said first component flowing within said first conduit;

second means for detecting the flow rate of said second component flowing within said second conduit;

flow regulating means disposed within said second conduit for regulating the flow of said second component within said second conduit; and feedback control means, operatively connected to said first means for detecting the flow rate of said first component and operatively connected to said second means for detecting the flow rate of said second component so as to receive signals from said first means for detecting the flow rate of said first component which are indicative of the flow rate of said first component within said first conduit and from said second means for detecting the flow rate of said second component which are indicative of the flow rate of said second component within said second conduit, for controlling said flow regulating means so that the amount of said second component within said mixture of said first and second components comprises a predetermined percentage of the amount of said first component within said mixture of said first and second components.

14. The system as set forth in claim 13, further comprising:
   a manually operated coating gun operatively connected to said mixer for receiving said mixture of said first and second components;
   memory means for storing, in chronological order, a plurality of flow rate values of said second component as detected by said second means for detecting the flow rate of said second component;
   an operation detecting sensor for detecting the on/off state of said manually operated coating gun;
   operation interruption detecting means for detecting an interruption in the operation of said manually operated coating gun as a function of time;
   target value setting means, operatively connected to said operation interruption detecting means and to said operation detecting sensor so as to receive signals from said operation interruption detecting means and from said operation detecting sensor, and operatively connected to said feedback control means, for setting a target value of said flow rate of said second component which corresponds to the flow rate value of said second component stored within said memory means and which is indicative of said flow rate of said second component before interruption of said operation of said manually operated coating gun, and which is applied to said feedback control means so as to control said flow regulating means in accordance with said set target value of said flow rate of said second component when said operation detecting sensor detects the fact that said manually operated coating gun has been switched on after the operation of said manually operated coating gun was interrupted; and
   control mode changing means for switching to control of said flow regulating means by said feedback control means based upon signals from said second means for detecting said flow rate of said second component, from control of said flow regulating means by said feedback control means based upon said target value of said target value setting means, after a predetermined length of time has passed after said target value setting means has set said target value of said flow rate of said second component.

15. A system as set forth in claim 14, further comprising:
   a target value input means for allowing manual input of a target value of said flow rate of said second component to be transmitted to said feedback control means; and
   target value changing means, operatively connected to said feedback control means and said operation detecting sensor, for changing the target value of said flow rate of said second component from said set target value of said flow rate of said second component as set by said target value setting means to said target value of said flow rate of said second component as manually inputted by an operator into said target value input means such that said inputted target value can be transmitted as a target value of said flow rate of said second component to said feedback control means when said target value changing means receives a signal from said operation detecting sensor as a result of said manually operated coating gun being switched on.

16. A system as set forth in claim 13, further comprising:
   a third tank containing a supply of said first component which is different from the supply of said first component disposed within said first tank;
   an upstream portion of said first conduit being provided with a common flow path portion for fluidic communication with both of said first and third tanks;
   a first, three-port, two-position valve for fluidic communication with said common flow path portion of said first conduit, a first branch pipe to which said first tank is releasably joined, and a first drain pipe, whereby, depending upon the disposition of said first, three-port, two-position valve, said first tank is fluidically connected to said common flow path portion of said first conduit, or alternatively, said first branch pipe is fluidically connected to said first drain pipe; and
   a second, three-port, two-position valve for fluidic communication with said common flow path portion of said first conduit, a second branch pipe to which said third tank is releasably connected, and a second drain pipe, whereby, depending upon the disposition of said second, three-port, two-position valve, said third tank is fluidically connected to said common flow path portion of said first conduit, or alternatively, said second branch pipe is fluidically connected to said second drain pipe.

17. A system as set forth in claim 16, wherein:
said first and second three-port, two-position valves comprise pneumatically controlled valves.

18. A system as set forth in claim 16, further comprising:
cleaning means for providing a cleaning fluid to said common flow path portion of said first conduit; and
valve means for fluidically connecting said cleaning means to said common flow path portion of said first conduit, so as to provide said cleaning fluid to said common flow path portion of said first conduit, said first conduit, and said manually operated coating gun, when said first and third tanks are not fluidically connected to said common flow path portion of said first conduit.

19. A system as set forth in claim 18, wherein:
said valve means comprises a two-position, two-port valve.

20. A system as set forth in claim 19, wherein:
said two-position, two-port valve is a pneumatically controlled valve.

* * * * *